US011281749B2

(12) United States Patent
Drey

(10) Patent No.: US 11,281,749 B2
(45) Date of Patent: Mar. 22, 2022

(54) METHOD OF SELECTIVE ONLINE DISSEMINATION OF DIGITAL ASSETS

(71) Applicant: Leonard L. Drey, St. Louis, MO (US)

(72) Inventor: Leonard L. Drey, St. Louis, MO (US)

(*) Notice: Subject to any disclaimer, the term of this patent is extended or adjusted under 35 U.S.C. 154(b) by 209 days.

(21) Appl. No.: 16/874,675

(22) Filed: May 14, 2020

(65) Prior Publication Data

US 2020/0387583 A1 Dec. 10, 2020

Related U.S. Application Data

(63) Continuation-in-part of application No. 16/408,556, filed on May 10, 2019, now Pat. No. 10,664,606.
(Continued)

(51) Int. Cl.
*G06F 21/10* (2013.01)
*G06Q 30/00* (2012.01)
*G06Q 20/38* (2012.01)
*G06F 21/60* (2013.01)
*G06F 16/955* (2019.01)
*G06F 21/64* (2013.01)
(Continued)

(52) U.S. Cl.
CPC .......... *G06F 21/10* (2013.01); *G06F 16/9558* (2019.01); *G06F 21/602* (2013.01); *G06F 21/64* (2013.01); *G06Q 20/1235* (2013.01); *G06Q 20/3829* (2013.01); *G06Q 30/0185* (2013.01); *H04L 67/02* (2013.01); *H04L 67/10* (2013.01); *H04L 67/141* (2013.01); *G06F 2221/0713* (2013.01)

(58) Field of Classification Search
CPC .................. G06F 21/10; G06F 21/602; G06F 2221/0713; G06F 21/64; G06F 16/9558; G06Q 30/0185; G06Q 20/3829; G06Q 20/1235; H04L 67/141; H04L 67/10; H04L 67/02
See application file for complete search history.

(56) References Cited

U.S. PATENT DOCUMENTS 9,734,348 B2 * 8/2017 Erofeev .............. G06F 11/1458
2015/0271179 A1 * 9/2015 Wang .................... G06F 21/105
726/30

OTHER PUBLICATIONS

"A Very Small RSA Encryption Example"—Humberto Ortiz-Zuazaga, University of Puerto Rico—Río Piedras, Nov. 18, 2015 https://ccom.uprrp.edu/~humberto/very-small-rsa-example.html (Year: 2015).*

(Continued)

*Primary Examiner* — Randy A Scott
(74) *Attorney, Agent, or Firm* — IP Strategies

(57) ABSTRACT

A method of controlling access to a digital asset by a user includes creating the digital asset, which includes a program file and a content file. The digital asset is associated with a primary key sequence and with a key-sequence document. The digital asset is stored at a distribution server. A user registration process, a user verification process, and an asset acquisition process are performed. The user registration process includes registering a storage device with the distribution server. The storage device includes a unique device identifier. The user is associated with the device identifier, with a secondary key sequence, and with a network interface. The network interface includes a unique interface identifier and has embedded therein an asset access application the secondary key sequence and a key sequence rule are provided to the user.

9 Claims, 2 Drawing Sheets

Related U.S. Application Data

(60) Provisional application No. 62/847,841, filed on May 14, 2019.

(51) Int. Cl.
- *H04L 29/08* (2006.01)
- *G06Q 20/12* (2012.01)
- *H04L 67/141* (2022.01)
- *H04L 67/10* (2022.01)
- *H04L 67/02* (2022.01)

(56) References Cited

OTHER PUBLICATIONS

"Compiling Remote Files: Redefining Electronic Document Management System Infrastructure (CReED)"—Alberto et al, Education Technological Institute of the Philippines, 2009 International Conference on Information and Multimedia Technology, Dec. 16, 2009 https://ieeexplore.ieee.org/document/5381186 (Year: 2009).*

* cited by examiner

METHOD OF SELECTIVE ONLINE DISSEMINATION OF DIGITAL ASSETS

CROSS-REFERENCE TO RELATED APPLICATIONS

This is a continuation-in-part of U.S. patent application Ser. No. 16/408,556, which was filed on May 10, 2019, which is related to, and claims priority from, U.S. Provisional Application for Patent No. 62/679,374, which was filed on Jun. 1, 2018, U.S. Provisional Application for Patent No. 62/700,659, which was filed on Jul. 19, 2018, and U.S. Provisional Application for Patent No. 62/782,910, which was filed on Dec. 20, 2018; which in turn is a continuation-in-part of U.S. patent application Ser. No. 15/600,501, which was filed on May 19, 2017, which is related to, and claims priority from, U.S. Provisional Application for Patent No. 62/338,816, which was filed on May 19, 2016, U.S. Provisional Application for Patent No. 62/428,673, which was filed on Dec. 1, 2016, and U.S. Provisional Application for Patent No. 62/439,217, which was filed on Dec. 27, 2016; which in turn is a continuation-in-part of U.S. patent application Ser. No. 14/965,855, which is related to, and claims priority from, U.S. Provisional Application for Patent No. 62/090,095, which was filed on Dec. 10, 2014, and U.S. Provisional Application for Patent No. 62/211,112, which was filed on Aug. 28, 2015; which in turn is a continuation-in-part of U.S. patent application Ser. No. 14/524,694, which was filed on Oct. 27, 2014, which is related to, and claims priority from, U.S. Provisional Application for Patent No. 61/895,654, which was filed on Oct. 25, 2013, U.S. Provisional Application for Patent No. 61/904,252, which was filed on Nov. 14, 2013, and U.S. Provisional Application for Patent No. 61/908,383, which was filed on Nov. 25, 2013; and is related to, and claims priority from, U.S. Provisional Application for Patent No. 62/847,841, which was filed on May 14, 2019; the disclosures of all of which are incorporated herein in their entireties.

FIELD OF THE INVENTION

The invention relates to methods of presenting content to a viewer, for example, on a computer display or a dedicated electronic display device. In particular, the invention relates to a system and method of control over access to the content, including modification of the content and dissemination of the content.

BACKGROUND OF THE INVENTION

Large quantities of content are available to users online. Content producers, publishers, and retailers have various avenues available to them to disseminate this content, either for a price or at no cost. However, due to the nature of online dissemination and digital availability in general, it can be difficult to control the dissemination of content, and the extent and nature of access once the content has been made available.

SUMMARY OF THE INVENTION

The method of the invention provides for multi-factor authentication regarding the distribution of and access to a digital asset.

According to an aspect of the invention, a method of controlling access to a digital asset by a user includes creating the digital asset, which includes a program file and a content file. The digital asset is associated with a primary key sequence and with a key-sequence document. The digital asset is stored at a distribution server. A user registration process, a user verification process, and an asset acquisition process are performed. The user registration process includes registering a storage device with the distribution server. The storage device includes a unique device identifier. The user is associated with the device identifier, with a secondary key sequence, and with a network interface. The network interface includes a unique interface identifier and has embedded therein an asset access application. The secondary key sequence and a key sequence rule are provided to the user.

Registering a storage device with the distribution server can include, for example, providing the storage device to the user, and storing the network interface on the storage device. Alternatively, registering a storage device with the distribution server can include connecting the storage device to a port of a user computer, connecting the user computer for communication with the distribution server, recording, at the distribution server, the device identifier, and associating the device identifier with the secondary key sequence and the key sequence rule.

The device identifier can be or include, for example, a container ID.

The distribution server can be, for example, a publisher server or a subordinate dissemination server.

The user computer can be a dedicated device for accessing digital assets including the digital asset.

The device identifier can be encrypted and stored on the storage device.

The network interface can be, for example, a browser.

The storage device can include an encrypted instance of the network interface.

The content file can be, for example, a text file, in which case the asset access application can be a word processor. In general, the content, file can include a text file, an image file, a sound file, and/or a video file, and the asset access application can be a multimedia player.

The user verification process can include;
connecting the user computer for communication with the distribution server via a network;
performing a key sequence verification check; and
performing a storage device verification check.
The key sequence verification check can include;
making the key-sequence document available to the user;
accessing the key-sequence document by the user;
entering a user key sequence according to the key sequence rule at the user computer, wherein the user key sequence includes elements of the primary key sequence and the secondary key sequence applied according to the key sequence rule; and
determining a positive key sequence verification check only if the entered user key sequence corresponds to the user key sequence associated with the user.

The key-sequence document can be, for example, a page retrievable at a network address, in which case making the key-sequence document available to the user can include providing the user with the network address. For example, the network can be the Internet and the key-sequence document can be a web page retrievable at a URL. The key-sequence document can include a unitary, multipage digital book, which can be a publicly-available open-source document. Entering at least one element of the user key sequence can cause display of a page of the key-sequence document to change. Entering the user key sequence according to the key sequence rule at the user computer can include entering elements of the primary key sequence and elements of the secondary key sequence according to a predetermined pattern that forms the user key sequence. For example, the user key sequence can include the elements of the secondary key sequence interleaved with the elements of the primary key sequence. Further, the user key sequence can include repetitions of at least one of the elements of the secondary key sequence and the elements of the primary key sequence.

Entering the user key sequence at the user computer can includes actuating input keys in sequence corresponding to the user key sequence at the user computer, capturing the input key sequence actuated at the user computer, and storing the captured input key sequence as a string variable on the storage device. The device identifier can be associated with the user key sequence, and the string variable can be checked against the device identifier received from the connected device with to determine if the entered user key sequence corresponds to the user key sequence associated with the user. The string variable can be sent to the distribution server to be checked to determine if the entered user key sequence corresponds to the user key sequence associated with the user.

The key sequence verification check can include providing a cue to the user regarding the user key sequence. For example, the cue can be an icon, which can include a color that is relevant to the cue.

The storage device verification check can include:
connecting the storage device to a port of the user computer;
reading the device identifier from the connected device at the user computer;
comparing the device identifier received from the connected device with the device identifier associated with the user; and
determining a positive storage device verification check only if the device identifier received from the connected device corresponds to the device identifier associated with the user.

The asset acquisition process can include allowing transmission of the digital asset the user computer, only if the storage device verification check and the key sequence verification check are both determined to be positive, and allowing storage of the digital asset at the user computer, only if an asset storage verification check is determined to be positive. For example, the asset storage verification check can include comparing the device identifier with an identifier included in at least one of the program file and the content file.

The user can be allowed at least one additional opportunity to remedy any deficiency in the asset acquisition process.

The method can also include accessing the digital asset by the user. In this case, storage of the digital asset at the user computer can include storage of the program file and the content file as an executable program file and an executable content file, respectively. Accessing the digital asset can include selecting the stored digital asset, merging the executable program file and the executable content file of the selected digital asset, loading the merged executable files into RAM at the user computer, and running the merged executable file. The executable program file and the executable content file can be encrypted files, in which case merging the executable program file and the executable content file can include decrypting the executable program file and the executable content file.

The asset acquisition process can include redirecting the network interface to an asset acquisition page, only if the storage device verification check and the key sequence verification check are both determined to be positive. In this case, redirecting the network interface to an asset acquisition page can include providing an active hyperlink at the network interface, and selecting the hyperlink by the user, or providing a number of active hyperlinks at the network interface, and selecting a correct one of the hyperlinks by the user. An inactivated hyperlink can be provided to the user if the storage device verification check and/or the key sequence verification check is not determined to be positive. Alternatively, the network interface can be redirected to a page other than the asset acquisition page if the storage device verification check and/or the key sequence verification check is not determined to be positive.

The asset acquisition process can also include allowing storage of the digital asset on the storage device for access by the user via the asset access application embedded in the network interface, only if the user first satisfies payment requirements associated with the digital asset.

The asset acquisition process can also include recording the user's IP address, and only allowing a single acquisition of the digital asset associated with the IP address.

The asset acquisition process can also include only allowing a single acquisition of the digital asset associated with the device identifier.

The asset acquisition process can include providing the user with an asset hyperlink at the user computer only if the storage device verification check and the key sequence verification check are both determined to be positive, and not providing the user with an asset hyperlink at the user computer otherwise. The hyperlink can be clicked at the user computer in order to cause the digital asset to be transferred to the storage device for access by the user via the asset access application embedded in the network interface. The asset acquisition process can include storing the digital asset at the user computer, only if the asset storage verification check is also determined to be positive.

The asset acquisition process can include providing the user with an asset hyperlink at the user computer. The hyperlink can be clicked at the user computer in order to cause the digital asset to be transferred to the storage device for access by the user via the asset access application embedded in the network interface only if the storage device verification check and the key sequence verification check are both determined to be positive. The digital asset can be prevented from being transferred to the storage device for access by the user otherwise. The asset acquisition process can include storing the digital asset at the user computer, only if the asset storage verification check is also determined to be positive.

The program file and/or the content file of the digital asset can prevent storage of the digital asset except on the storage device having the device identifier and the network interface having the corresponding interface identifier.

The program file of the digital asset can prevent access of the content file of the digital asset except via the asset access application embedded in the network interface.

The content file of the digital asset can include permissions that define a nature and extent of access of the content file of the digital asset allowed to the user. The content file of the digital asset can be modified at the distribution server to update the permissions, and the modified content file can be provided to the user. The content file of the digital asset can be accessed by the user via the asset access application embedded in the network interface to an extent no greater than that defined by the permissions as enforced by the network interface. The nature of access of the content file of the digital asset allowed or denied to the user as defined by the permissions can include read access, write access, copy access, and print access. Copy access and print access can include screen-shot access. The asset access application can include a content editor, in which case allowing write access to the content file of the digital asset can include allowing access to the content editor by the user when the digital asset is store in the storage device, and denying write access to the content file of the digital asset can include denying access to the content editor by the user when the digital asset is store in the storage device, thereby preventing editing of the content file of the digital asset. For example, the content file can be a text file, and the content editor can be a text editor. The content file of the digital asset can be edited by the user using the content editor, only if write access is allowed, and the executable file can be modified to reflect the edited content file.

The extent of access of the content file of the digital asset allowed or denied to the user as defined by the permissions can include a time duration of access to the content file.

The extent of access of the content file of the digital asset allowed or denied to the user as defined by the permissions can include access to any portion of the content file. The content file can include at least two types of files, including a text file, an image file, a sound file, and a video file, and the asset access application is a multimedia player. The permissions can allow the user to access at least one type of file and deny the user to access at least one type of file.

According to another aspect of the invention, a method of obtaining access to a digital asset by a user at a user computer includes obtaining a registered storage device, a secondary key sequence, and a key-sequence rule, from a distribution outlet. The registered storage device includes a unique device identifier and a dedicated asset browser. The registered storage device is connected to a port of the user computer. The user accesses a key-sequence web page associated with the digital asset and a primary key sequence. The user enters at the key-sequence web page according to the key-sequence rule, a user key sequence including elements of the secondary key sequence and the primary key sequence, in order to reveal a correct key-sequence hyperlink. A string variable is generated corresponding to the entered user key sequence. The key-sequence hyperlink is selected. The string variable, the device identifier, an IP address of the user computer, and a URL of the key-sequence web page are transmitted to the distribution outlet in response to selection of the key-sequence hyperlink. The string variable and the device identifier are validated at the distribution outlet. An asset acquisition web page is displayed at the user computer, only if the string variable and the device identifier validated positively. The asset acquisition web page includes an asset hyperlink. The user selects the asset hyperlink. The digital asset is transferred to the user computer in response to selection of the asset hyperlink, and is then stored to the user computer only if the device identifier corresponds to a file code include in the program file and/or the content file. The digital asset includes a program file and a content file. The stored digital asset is selected. The program file and the content file are merged in response to selection of the stored digital asset, and the digital asset is presented to the user via the dedicated asset browser.

Obtaining a registered storage device can include providing to the user, by the distribution outlet, a storage device, and associating, by the distribution outlet, the unique device identifier of the storage device with the user and with the secondary key sequence. Alternatively, if the user has a suitable storage device, obtaining a registered storage device can include connecting a storage device at a port of the user computer, connecting the user computer for communication with a distribution outlet server, reading the unique device identifier of the storage device at the distribution outlet server, and associating, by the distribution outlet, the unique device identifier of the storage device with the user and with the secondary key sequence.

The string variable can be stored in RAM at the user computer.

The user can enter, at the key-sequence web page according to the key-sequence rule, a user key sequence including elements of the secondary key sequence and elements of the primary key sequence, causing a series of key-sequence hyperlinks to be revealed as the user key sequence is entered, and a correct one of the series of key-sequence hyperlinks must be selected in order to transmit the string variable, the device identifier, the IP address of the user computer, and the URL of the key-sequence web page to the distribution outlet and display the asset acquisition web page.

Payment can be required from the user before downloading the digital asset to the user computer in response to selection of the asset hyperlink.

Download authentication can be required prior to downloading the digital asset to the user computer in response to selection of the asset hyperlink.

The program file and the content file can be first and second JavaScript programs. The dedicated asset browser can include a unique JavaScript engine configured to prevent copying of the contents of RAM of the user computer.

DETAILED DESCRIPTION OF THE INVENTION

The method of the invention provides for multi-factor authentication to control the distribution of and access to a digital asset. According to certain implementations of the invention, the method can include multi-step multi-factor authentication for distribution and granular access permissions that can be updated as desired.

Figure 1:
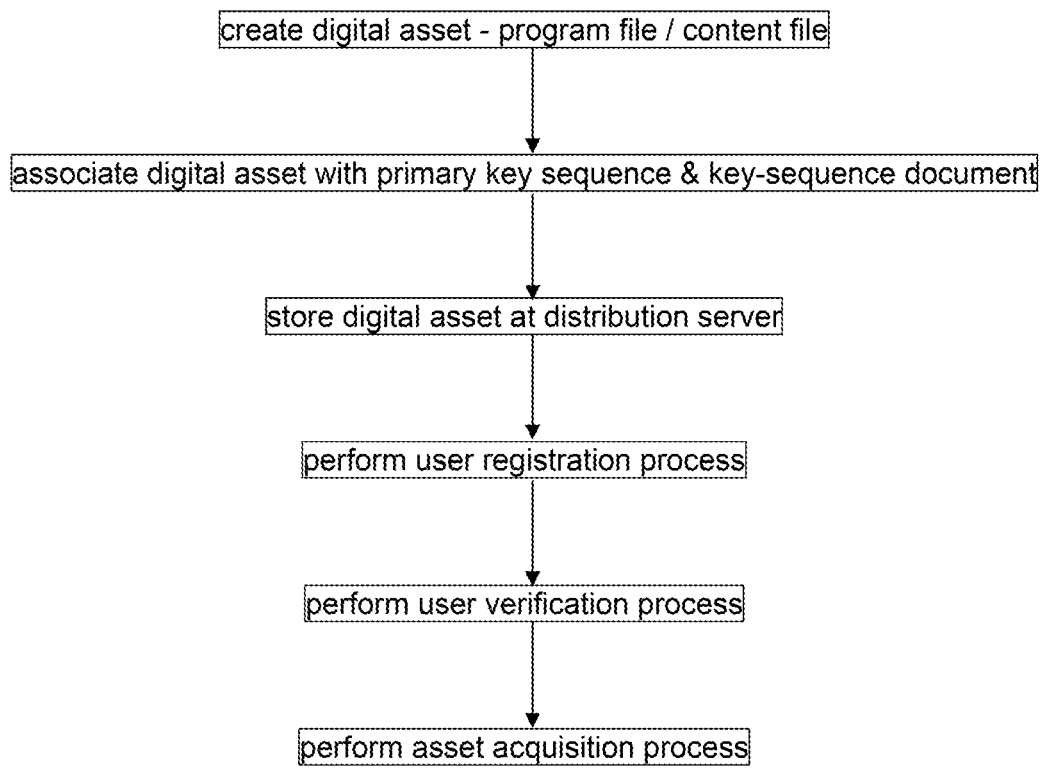
FIG. 1 shows a flow diagram of an exemplary embodiment of the method of controlling access to a digital asset by a user of the invention.

With reference to FIG. 1, a method of controlling access to a digital asset by a user includes creating the digital asset, which includes a program file and a content file. The content file governs interaction with other functions in the system, such as a network interface, and enforces permissions and protections manifest in the operation of the system and method. The content file includes the specific content that the user wants to access, and preferably the permissions that tailor presentation of and access to the content for that particular user, or for a class of users to which the user belongs. The program file and content file are functionally paired, but transferred as separate elements that are implemented together only after certain authentication requirements have been satisfied. The content file can include any type of content. For example, the content file can be a text file, in which case the asset access application can be a word processor. In general, the content file can include any type or multiple types of content, such as a text file, an image file, a sound file, and/or a video file. Likewise, the asset access application can be used to access any particular type or multiple types of content file, and can be a multimedia player capable of accessing and presenting content that includes multiple media types.

The digital asset is associated with a primary key sequence and with a key-sequence document and stored at a distribution server. The distribution server can be, for example, a publisher server belonging to the actual publisher of the digital asset, or a subordinate dissemination server, such as the server of a retailer licensed by the publisher. The primary key sequence is tied to the particular asset, and can be different for different assets. The key-sequence document provides an interface for the user to enter a user key sequence related to the primary key sequence, as described in more detail below.

In order to access a digital asset, the user must perform a user registration process, a user verification process, and an asset acquisition process.

The user registration process includes registering a portable storage device (or internal hard drive) with the distribution server. Use of a portable storage device connected to a user computer will be discussed primarily herein, but the invention is not limited in scope only to portable devices. In each case an internal hard drive can be used instead or as well, and it is intended that all aspects of the invention relate to the use of an internal hard drive. The portable storage device can be, for example, a common thumb drive, external hard drive, SSD drive or any other memory device that can store programs and data and can interface for communication with a computing device. Many such portable storage devices include a unique device identifier, such as a container ID, and hard drives have a unique MAC address. If a portable storage device to be used with the method of the invention does not have an assigned container ID, a unique identifier must be assigned as part of the registration process and embedded in the storage device. Also as part of the registration process, the user is associated with the device identifier, with a secondary key sequence, and with a network interface, such as by linking the user with this information in a database. The secondary key sequence is tied to the particular storage device, and preferably is different for different users or classes of users. The network interface is a proprietary, dedicated interface, such as a dedicated browser, that includes a unique interface identifier and has embedded therein a proprietary, dedicated asset access application. The secondary key sequence and a key sequence rule or rules are provided to the user for later use in accessing the digital asset.

A portable storage device can be provided to the user as part of the registration process, and the network interface is preferably stored on the portable storage device prior to providing it to the user. Alternatively, a user can opt to provide a storage device for registration. In this case, registering the portable storage device with the distribution server requires connecting the portable storage device to a port of a user computer (physically or wirelessly), and establishing communication between the user computer and the distribution server. The distribution server can then access the storage device to obtain the device identifier, which it will then associate with the secondary key sequence and the key sequence rule. If a device identifier other than a container ID is used, it can be encrypted before being stored on the storage device, as can an encrypted instance of the network interface. The user computer can be any computing device, such as a typical desktop or laptop computer, a tablet or smartphone, or a dedicated device configured for accessing digital assets.

In order to perform the user verification process, the user computer is connected for communication with the distribution server via a network. The user verification process includes two steps, namely, a key sequence verification check and a storage device verification check, which both must be completed successfully in order to verify the user.

The key sequence verification check begins by making the key-sequence document available to the user, who then accesses the key-sequence document. The key-sequence document is preferably a page or series of pages retrievable at a network address, so the user must be provided with the network address at which the page can be accessed. For example, a private network can be used for communication or the Internet can be used, in which case the key-sequence document can be a web page retrievable at a URL.

Instead of being a single static web page, the key-sequence document can be or include a unitary, multipage digital book, which can be a publicly-available open-source document. An example of such a digital book is described in U.S. Patent Application Publication 2016140530A1, which was published on May 19, 2016, the entire disclosure of which is incorporated herein. Entering one or more elements of the user key sequence can cause display of a page of such a multi-page key-sequence document to change before entry of the next element.

At the key-sequence document, the user will be prompted to enter a user key sequence according to the key sequence rule or rules. This user key sequence includes elements of the primary key sequence and the secondary key sequence, applied according to the key sequence rule. That is, elements of the primary and secondary key sequences must be entered according to the rule in order to result in the user key sequence. A positive key sequence verification check is determined only if the entered user key sequence corresponds to the user key sequence associated with the user at the distribution server.

When following the key-sequence rule, elements of the primary key sequence and elements of the secondary key sequence are entered according to a predetermined pattern that forms the user key sequence. For example, the user key sequence can include the elements of the secondary key sequence interleaved or combined in any manner with the elements of the primary key sequence. Further, the user key sequence can include repetitions of at least one of the elements of the secondary key sequence and the elements of the primary key sequence, if so dictated by the rule.

The user key sequence preferably is entered at the user computer by actuating input keys in sequence corresponding to the user key sequence at the user computer, although voice recognition or other forms of input can be used. The input key sequence actuated at the user computer is captured and stored as a string variable on the portable storage device. The device identifier was associated with the user key sequence, and therefore the string variable can be checked against the device identifier received from the connected device to determine if the entered user key sequence corresponds to the user key sequence associated with the device. Thus, the string variable can be sent to the distribution server to be checked to determine if the entered user key sequence corresponds to the user key sequence associated with the user.

As the user key sequence is entered element-by-element, one or more cues can be provided to the user regarding the user key sequence, in order to assist with entry of the key sequence. For example, the cue can be an icon displayed to the user, which can include a color that is relevant to the cue. In the case in which the key-sequence document is a multi-page document, a cue can be included on many or all of the pages.

To perform the storage device verification check, the portable storage device must be connected to a port of the user computer. This step can include wireless connection of the storage device to the user computer, such as between Bluetooth® ports. The device identifier is then read from the connected device at the user computer and is then compared with the device identifier associated with the user. Based on this comparison, a positive storage device verification check is determined only if the device identifier received from the connected device corresponds to the device identifier associated with the user.

The asset acquisition process can then allow transfer of the digital asset to the user computer, but only if the storage device verification check and the key sequence verification check are both determined to be positive. Storage of the digital asset at the user computer is then allowed only if a further asset storage verification check is determined to be positive. For example, the asset storage verification check can include a comparison of the device identifier with an identifier included in the program file and/or the content file, and/or a simple password check. Thus, transfer and storage are performed in two steps, each of which requires its own, preferably multi-factor, authentication check. Although a failed authentication check can result in a permanent prohibition against the transfer or storage of the digital asset by the user or at the user's IP address, the user can be granted one or more additional opportunities to remedy any deficiency in the asset acquisition process if desired. The digital asset is preferably stored at the user computer as an executable program file and an executable content file.

Once the digital asset is transferred and stored, it can be accessed by the user by selecting the stored digital asset, such as by selecting a link representing the asset in a directory. The executable program file and the executable content file of the selected digital asset are then merged, and the merged executable files are loaded into RAM at the user computer, and the merged executable file is run to provide the asset to the user. The executable program file and the executable content file can be encrypted files, in which case executable program file and the executable content file can be decrypted when merged or run.

The asset acquisition process can begin by redirecting the network interface to the asset acquisition page, but only if the storage device verification check and the key sequence verification check are both determined to be positive. In this case, an active hyperlink can be provided at the network interface and selected by the user. In the case of a multi-page key-sequence document, a number of active hyperlinks can be provided at the network interface at different intervals in the key-sequence process, and a correct one of the hyperlinks must be selected by the user. Use of an active hyperlink will not be provided to the user or will be blocked if the storage device verification check and/or the key sequence verification check is not determined to be positive. Alternatively, the network interface can be redirected to a page other than the asset acquisition page if the storage device verification check and/or the key sequence verification check is not determined to be positive.

The user can also be required to first satisfy payment requirements associated with the digital asset as part of the asset acquisition process before transfer or storage of the digital asset on the portable storage device for access by the user via the asset access application embedded in the network interface is allowed.

As part of the asset acquisition process, the user's IP address can be recorded in order to apply access restrictions and denials. For example, it can be the case that only a single acquisition of the digital asset associated with the IP address is allowed. Alternatively, or in addition, restrictions and denials can be linked to other identifiers. For example, the asset acquisition process can also include only allowing a single acquisition of the digital asset associated with the device identifier per valid satisfaction of the criteria.

The asset acquisition process can begin by providing the user with the correct asset hyperlink at the user computer, but only if the storage device verification check and the key sequence verification check are both determined to be positive, and not providing the user with an asset hyperlink at the user computer otherwise. The hyperlink can be clicked at the user computer in order to cause the digital asset to be transferred to the user computer. The digital asset can be stored at the user computer, then only if the separate asset storage verification check is also determined to be positive. For example, the program file and/or content file of the digital asset can prevent storage of the digital asset except on the portable storage device having the device identifier and the network interface having the corresponding interface identifier. Separately, access of the content file of the digital asset except via the asset access application embedded in the network interface can be prevented.

Although access to the digital asset is granted, the scope of access granted to the user can be limited as desired. To this end, the content file of the digital asset can include permissions that define a nature and extent of access of the content file of the digital asset allowed to the user. The content file of the digital asset can be modified at the distribution server to update the permissions, and the modified content file can be provided to the user to upgrade, downgrade, or otherwise modify the user's scope of access. In this way the content file of the digital asset can be accessed by the user via the asset access application embedded in the network interface to an extent no greater than that defined by the permissions as enforced by the network interface.

The nature of access of the content file of the digital asset allowed or denied to the user as defined by the permissions can include any or all of read access, write access, copy access, and print access. Copy access and print access can be allowed or denied to allow or deny screen-shot access. For example, if the asset access application includes a content editor, then allowing write access to the content file of the digital asset can include allowing access to the content editor by the user when the digital asset is stored in the portable storage device, and denying write access to the content file of the digital asset can include denying access to the content editor by the user when the digital asset is stored in the portable storage device, thereby allowing or preventing editing of the content file of the digital asset. For example, if the content file is a text file, and the content editor is a text editor, then the content file of the digital asset can be edited by the user using the content editor, but only if write access is allowed. Once edited, the executable file can be modified to reflect the edited content file.

The extent of access of the content file of the digital asset allowed or denied to the user as defined by the permissions can include, for example, a time duration of access to the content file. This would allow for rental of digital assets for fixed amounts of time. The extent of access of the content file of the digital asset allowed or denied to the user as defined by the permissions can instead or also include access to any portion of the content file. For example, the content file of a multi-media asset can include at least two types of files, such as two or more of a text file, an image file, a sound file, and a video file, for display on an asset access application that is a multimedia player. In this case, the permissions can allow the user to access at least one type of file and deny the user to access at least one type of file. For example, a particular user might be allowed to view the video portion of a digital asset but not be allowed to listen to the sound portion.

Figure 2:
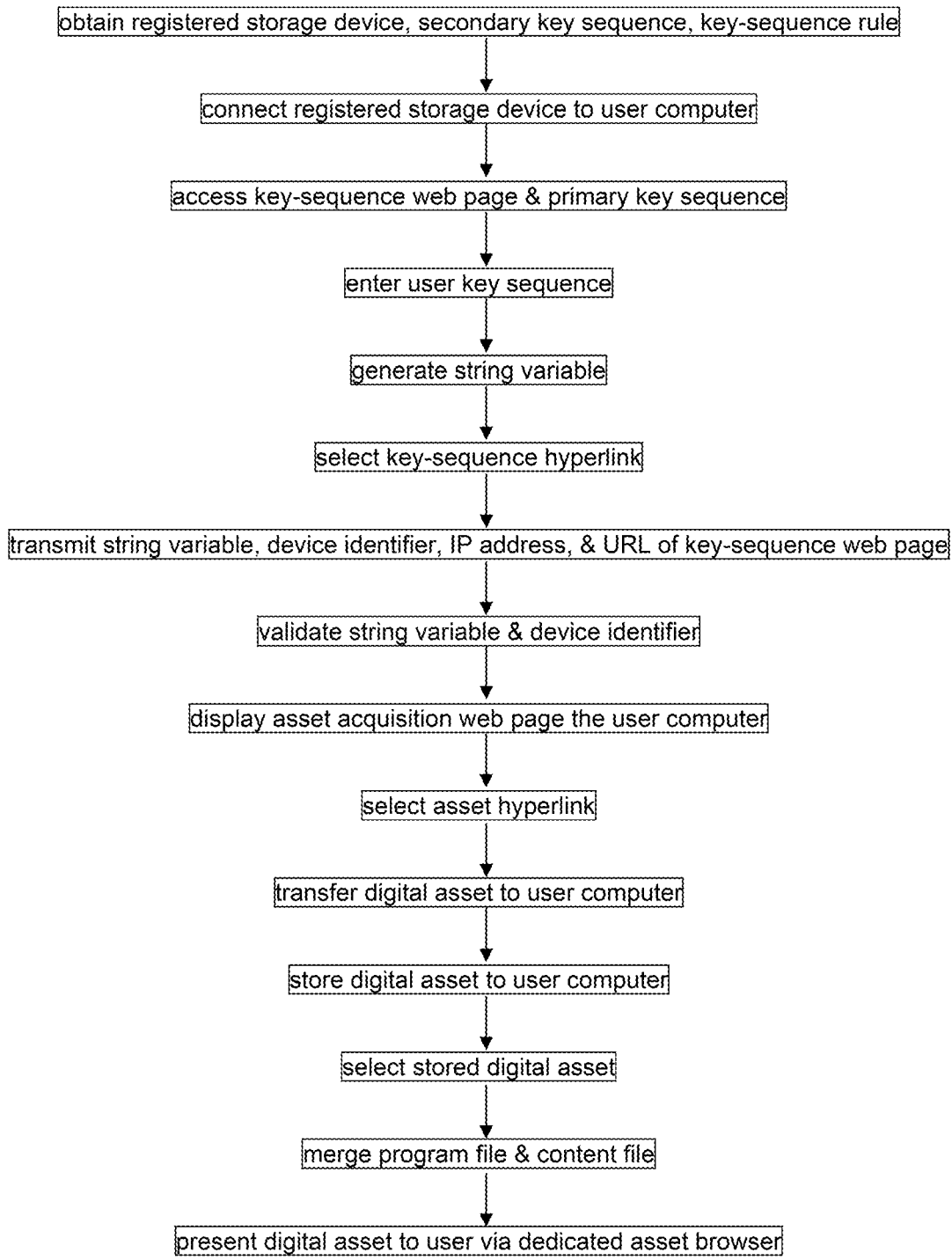
FIG. 2 shows a flow diagram of another exemplary embodiment of the method of obtaining access to a digital asset by a user at a user computer of the invention.

With reference to FIG. 2, a method of obtaining access to a digital asset by a user at a user computer includes obtaining a registered storage device, a secondary key sequence, and a key-sequence rule, from a distribution outlet, such as a publisher's website or an online retailer. The registered storage device includes a unique device identifier such as a container ID, and a dedicated asset browser for use in accessing the asset. The registered storage device can be provided by the distribution outlet, or can be provided by the user and subsequently registered. For example, the user can be provided by the distribution outlet with a storage device. The distribution outlet would associate the unique device identifier of the storage device with the user and with the secondary key sequence. Alternatively, if the user has a suitable storage device, it can be connected at a port of the user computer, which in turn is connected for communication with a distribution outlet server, which reads the unique device identifier of the storage device remotely and associates the unique device identifier of the storage device with the user and with the secondary key sequence.

The registered storage device is then connected to a port of the user computer, or connected wirelessly. The user accesses a key-sequence web page associated with the digital asset and an primary key sequence. At the key-sequence web page, the user enters a user key sequence according to the key-sequence rule, and a string variable corresponding to the entered user key sequence is generated. The string variable can be stored in RAM at the user computer. The user key sequence including elements of the secondary key sequence and elements of the primary key sequence. Correct entry of the user key sequence reveals a correct key-sequence hyperlink, which, when selected by the user causes the string variable, the device identifier, an IP address of the user computer, and a URL of the key-sequence web page to be transmitted to the distribution outlet. At the distribution outlet, the string variable and the device identifier are validated and an asset acquisition web page is displayed at the user computer, but only if the string variable and the device identifier validated positively.

In the case in which the key-sequence web page is a multi-page document, when the user enters the user key sequence, a series of key-sequence web page hyperlinks can be revealed as the user key sequence is entered. A correct one of the series of key-sequence hyperlinks must be selected in order to transmit the string variable, the device identifier, the IP address of the user computer, the URL of the key-sequence web page to the distribution outlet and display the asset acquisition web page, and the URL of the asset acquisition web page.

The asset acquisition web page includes an asset hyperlink. When the user selects the asset hyperlink, the digital asset is transferred to the user computer. However, the digital asset is then stored to the user computer only if the device identifier corresponds to a file code included in the program file and/or the content file. The digital asset is stored at the user computer as a program file and a separate content file. When the user selects the stored digital asset, the program file and the content file are merged, and the digital asset is presented to the user via the dedicated asset browser. The program file and the content file can be JavaScript programs. The dedicated asset browser can include a unique JavaScript engine configured to prevent copying of the contents of RAM of the user computer.

Further download authentication, preferably multi-factor authentication, can be required prior to storing the digital asset to the user computer in response to selection of the asset hyperlink, to guard against unauthorized access in case of, for example, a stolen or lost registered thumb drive. In addition, payment can be required from the user before downloading the digital asset to the user computer in response to selection of the asset hyperlink.

Exemplary Alternative Implementations

The method of the invention is intended to facilitate the online dissemination of digital books and other digital publications only in one single irreproduceable copy per authorized user acquisition, and furthermore to exclusively limit dissemination of the digital book to acquirers who are designated by the digital book's publisher or by a subordinate disseminator, or to otherwise limit access of any kind as desired.

This method additionally will enable the publisher or disseminator of a digital book to fully limit the book's authorized user list through only three conjoint means: that is, first, through the uploading of a valid email address for every intended user to the publisher's server;

second, through assigning each of these authorized users a particular, simple (preferably alphanumeric) code comprising a single accessory key or key series that each authorized user must enter one or more times as will be explained to each user, at the digital book's key-sequence web page or pages, this information also to be uploaded the publisher's server, and third, through the conveying to the publisher's server of information indicating which authorized users will receive which registered thumb drives (or other portable memory device) for the storing of and operation of this digital book.

To implement the method, software programs can be created and uploaded to the publisher's server for every digital book that will thusly be disseminated online. These can include on-line, key-sequence interleaved electric book web pages, publisher's server-side software programs, and the publisher's book dissemination web page.

Preferably, two on-line, key-sequence interleaved electric book web pages will be provided. The first key-sequence web page, which in a preferred implementation can be a unitary interleaved, multi-page electronic book document as described previously, need contain no content that will be manifest to users other than a hyperlink to a target successor book dissemination web page, and a basic sequence of action-key-reachable screens, which in this implementation will be specific-to-this web page and reached in a particular order by the user, through employing a succession of meaningful action keys, the meaning of which to the CPU is coded for in the electronic book's program file In the key-sequence document, in addition to a correct basic action-key sequence, additionally to be struck between the striking of each of the keys in this basic action-key sequence, there will be for different expected authorized recipients of the book an additional, accessory non-meaningful key "code," including one or a set of non-meaningful keys that will be struck, to make the specific key sequence that will be entered by users while this web document is open, specifically different for the different expected authorized recipients of the book.

In the program file of this key-sequence document, there will be software to enable all of the user's keystrokes whenever struck, from the time the document has been opened online and until a first hyperlink is attempted by the user, to be captured in a string variable, here called cVar, kept thereafter in RAM. To restate—all keys struck by the user of this key-sequence document, whether defined action keys or non-meaningful keys, will be so captured once the document has been opened and until the user clicks on a first hyperlink within this key-sequence document.

When the user attempts to access a first hyperlink from the key-sequence document, the software presenting this document, which software in this implementation will be present in the program file of a unitary interleaved, multi-page electric book, will transmit the value of this string variable, along with the user's IP address, and the value of two other variables indicating, first, whether a registered thumb drive is present in an accessory drive of the computing device that is in use, and second, if there is, what alphanumeric code is encoded into this registered thumb drive, to the publisher's server at the same period of time when the URL of the desired hyperlink web page is.

To exemplify a basic action-key sequence for a key-sequence document in the preferred implementation where the document is a unitary interleaved multi-page electric book, this can be, for example, the following series: "p", "p", "w", "p" "p", "q", "q", "o", "o", where "o", "p", "q", and "w" are all defined action keys, each of which will change the string that is currently being read by the CPU of the computing device that is in use. And to exemplify an accessory, non-meaningful key sequence, which must be entered between every one of the basic action-key strikes, for the user's code entry series to be registered as correct by the publisher's server, this can be the striking of an "a" or a "c" key, or the striking of a certain series of keys each time, such as an "a", "a", and "c" together, every time—where to restate, in this implementation the "a" and the "c" will not be defined in the program file of this document, and so the striking of either of these keys will not change the string that is being read by the CPU and being seen by the user.

In the case of every user who is expected and authorized to acquire a particular digital book from the online source described under this method, the publisher or the subordinate disseminator of the book will be required to communicate to the publisher's server the following information: which non-meaningful accessory "code" of key strikes each authorized user will be expected to enter, between every action-key strike in the basic action-key sequence.

For key-sequence documents that are unitary interleaved, multi-page electric books, all of the screens that the user will see when correctly entering the basic action-key sequence can embrace cues or statements indicating which action key should be struck by the user next. In a preferred implementation, such cues can be icons of different colors, where there can be a limited number of icon configurations, such as three, and three or more icon colors—one icon configuration meaning jump ahead or back within the text file of the key-sequence document by one string, whether this string presents a main screen or presents an interleaf, the second icon configuration meaning jump ahead or back within the text file by the number of strings that comprises the number of interleaves that exist between every main screen of the document, plus one, and the third icon denotes an hyperlink (whether or not this hyperlink will correctly lead the user to the correct successor book dissemination screen, being at the choice and according to the stratagem of the book's publisher or subordinate book disseminator), and one icon color directing the user to choose that action key, out of a couplet of toggling action keys, that will direct the CPU to "jump ahead," the second icon color, the same, except "jump back," and the third or more having no particular such meaning. The entire system of icons and colors can be made characteristic and publicly available online, at the publisher's website.

A publisher's server-side software program will determine whether the current value of the string variable, cVar, that has been uploaded to it at the time when the user of the key-sequence document has first clicked on a hyperlink is correct, and so whether this user is an authorized and expected user of the digital book at issue.

This program will utilize the identity of the registered thumb drive that must be present in the user's computer at this time, to determine whether the value of cVar is correct, that is, whether it matches what sequence of key strikes is expected given the accessory key information respectively uploaded to the publisher's server for this user's registered thumb drive, by the publisher or the subordinate book disseminator.

If and only if the value of the string variable, cVar, is found to be correct, will this publisher's server-side program allow the user's computer to access the URL that has just been selected as a hyperlink by the user—which will be meaningful if this URL was the one of the web page that could allow a user if an authorized, expected user, to obtain a copy of the digital book at issue directly from the publisher—that is, if that URL is for the book dissemination web page.

On the other hand, in cases where cVar has been determined to be wrong by this server-side program, at the publisher's or subordinate book disseminator's option, the respective user can be blocked from accessing the key-sequence document ever again from the current IP address, or can be given another chance immediately to get the entire key sequence right, or be given a limited number of chances immediately, or be given an infinite number of chances immediately—in these cases, this being feasible because the publisher's server will have information indicating the user's current IP address and will also have information indicating the identity of the registered thumb drive currently in use. If the user will be offered a second or further immediate attempt to get the entire expected key-sequence right, the publisher's server will allow the URL of the key-sequence web page to be refreshed, while if it will not, it will not so allow.

Where there will be both a text file key sequence web page and a program file key-sequence web page, these web pages can require application of the same accessory, non-meaningful key sequence.

In a case where a user has entered the text file or program file book dissemination web page URL directly into his or her Web browser address bar, this user can be prevented from accessing that book dissemination Web page by this server-side software program, either because it will be able to determine that the value of cVar that is in RAM is wrong for the registered thumb drive that is present in the user's computer, or determine that there is no registered thumb drive present in this computer, or determine that the registered thumb drive that is present in the computer is not authorized for the purpose.

The publisher's book dissemination web page for the text file or program file of any book, which can be a JavaScript page, can have as its exclusive content a dialog box wherein the user will be expected to enter the user's proper email address as previously provided to the publisher or subordinate book disseminating agent, or provide the unit identification label that identifies the registered thumb drive that has been assigned to this user for this purpose, or redundantly, both.

Then, in order for the text file or program file of the digital book to be released to this prospective user, the conjoint server-side program must determine that the email address as it has been entered is correct, or that the unit identification of the registered thumb drive as entered is correct, or that both are correct. Further, the online book dissemination web page will obtain from the user at this time, and forward to the publisher's server for evaluation by this program, the alphanumeric code of any registered thumb drive that is present in the computing device in use, or, if no such registered thumb drive is present, or if an incorrect registered thumb drive is present, display an error message and prevent the digital book from being released.

If the criteria are satisfied, this server-side software program will cause an email to be sent to the user that has as an attachment an executable file which represents only the text file of the digital book at issue, or only the program file of the digital book at issue (rather than, as previously, both the text file and the program file together as a unit), for opening from a computing device that has in an accessory drive the expected authorized user's assigned-for-this-book registered thumb drive, so that executable file can be opened and immediately downloaded only onto this particular registered thumb drive.

If a malevolent, unauthorized user has entered the book dissemination page's URL directly into a Web browser address bar, this malevolent user will be prevented by this server-side program from employing the book dissemination web page's dialog box to have that book released to this user because any or all of the following: A correct for this purpose email address, a correct for this purpose registered thumb drive, or the correct respective cVar value for them will be found to be absent by this server-side program.

A publisher's server-side software program can block a registered user from being inappropriately issued a second copy of a book. This program will register whenever the executable file that represents the text file of a digital book has been transmitted as an email attachment to an expected and authorized user, and afterward it will block the server from transmitting the URL representing the book dissemination web page to this user—as a non-limiting example, through having checked for the presence of that registered thumb drive in the computer at issue—no matter which IP address will be in use by the user at this time.

Then second, to promote the usefulness of the overall electronic-book method, modifications of the method as earlier described can be implemented, as follows.

First, to minimize the likelihood of reverse engineering of any of the software components, the following can be encrypted and pre-loaded to every registered thumb drive as intrinsic elements of its operating system, in addition to the registered thumb drive's operating system, itself: the alphanumeric code pertaining to this registered thumb drive; an iteration of the proprietary web browser by which distributed documents will be read; and the special limited functionality word processor that will be used in conjunction with the proprietary web browser, to enable revisions of the text file executable for the digital book at issue to be made by the user and again stored.

Also, when the authorized and expected user of a digital book is to be assigned a copy of the digital book, as has been discussed above, what will be sent from the publisher's server as an executable file attached to an email will not be the respective entire and intact document as a unitary document, but rather instead, only an executable file corresponding to the text file component of that digital book.

Further, when a text file executable or program file executable has been thusly transmitted to the user, that executable file now will have encoded within it the authorized and expected user's appropriate registered thumb drive's particular alphanumeric code; and furthermore, that text file executable, or program file executable, once it has been selected by the user as an email attachment, will query the computing device that currently is in use so as to determine if the expected registered thumb drive is present in an accessory drive. And then only if it is, will the text file executable or program file executable itself direct its transfer and storage on that registered thumb drive.

Then when an authorized user wishes to use the digital book at issue, he will click on the name within the registered thumb drive's list of contents that corresponds to the text file executable for the book. And only at this point, according to provisions within the operating system of registered thumb drives, will a full and complete document be formed in RAM, so it can be read there, again only by the proprietary web browser which is housed within the operating system of this registered thumb drive.

In some implementations, the program file executable for a book can be preloaded onto a registered thumb drive.

In an implementation of the method, when the full and complete, unitary document has been assembled and portions of it presented to the user one by one, then when the user has employed the proprietary web browser's "view source code" functionality in order to view what are, per this method as previously described, acceptable portions of that intact unitary digital book's text file, what rather he will be able to view and potentially to modify, through the word processor that is embedded in the operating system of this registered thumb drive, will be only the specific permissible portions of the text file as represented by the executable version of the text file, instead—in particular, those portions that this user has already viewed. Then when a user employing this word processor has changed the current version of the book's text file, the changes will be stored as a modified version of the text file executable, which will replace the previous version on this registered thumb drive.

In an alternate implementation, one registered thumb drive can be used to download multiple books; but for each registered thumb drive, only one accessory, non-meaningful key sequence will be used.

The method of the invention provides many advantages. For example, when it is used for disseminating digital books from a publisher's website, only a single or two individual key-sequence web pages, and only a single, individual book dissemination web page will be needed for every book, rather than there needing to be a multiplicity of each of these.

Authorized and expected users of a digital book, and also book disseminators who are subordinate to the publisher, will not need to know and record the complex alphanumeric code of each registered thumb drive that will be used to store and operate this book, but rather they can merely know the unit label of their own registered thumb drive or registered thumb drives that will be used, respectively.

Each user's specific accessory key code, although this is of seminal importance from the standpoint of the method, need not be at all complex or difficult to remember and use.

For individual book disseminators operating under the method, to restrict a digital book's dissemination to a specific, limited group of users should appear to be a simple task, as accomplishing this will require nothing more than filling three sets of blanks on a simple online form maintained by the publisher—those constituting, for every user, a blank for a valid email address, a blank for the user's idiosyncratic accessory key combination as this will be assigned to the user, and a blank for the respective registered thumb drive unit identifier.

It is also worth noting that although this method, which can have at its core two websites, one of which is a key-sequence document, which preferably is an electric book multipage document, although particularly useful to facilitate the dissemination of modifiable .N11 electric books from a website, it is beneficial for use in the limited distribution of other digital objects—including ones that cannot at the publisher's option be modified, and including ones such as news articles, reports, games, graphics, pictures, movies, or music.

Digital documents and other assets under this method, by the intent of the publisher can be made not modifiable. As a non-limiting example, this can be achieved through a modification the program file of a document so that display of the text file by the proprietary web browser is prevented.

As noted above, the proprietary browser, through features in its software, can prevent the creation of screen shots.

A publisher can hinder or prevent creation of a plurality of copies of a digital document when only one has been acquired. For example, at the time of the dissemination of a text file executable by a publisher's server-side program, this text file executable will be assigned a unique alphanumeric identifier, such as within the executable's filename. For a user to obtain a text file executable from the publisher's book dissemination web page, the user must enter the unit identification label of the registered thumb drive on which the text file executable will be stored. When the executable attachment is emailed, and when selected by the user for storage, the executable file, itself, will confirm that the correct registered thumb drive is inserted in an accessory drive of the computer, and as well, store the unique alphanumeric identifier in a string variable on the registered thumb drive, termed dVar, the values of which will be non-deletable and non-modifiable. Before the text file executable is stored on the registered thumb drive, two conditions must be met: that the correct registered thumb drive is inserted in an accessory drive of the computer, and that the unique alphanumeric identifier is absent from the dVar variable. If either is not met, storage of the text file executable will not be permitted. The only allowable exception is if the text file executable is to be returned to a registered thumb drive from which it had been copied and deleted, with erasure of the text file executable from the second registered thumb drive.

To prevent illegitimate copying of non-text file executable materials such as image files, sound files, movies, and the like from a registered jump drive, all digital documents that are to be presented to a user under this method will require presentation by a conjoined text (content) file and program file program stored in RAM, using the proprietary browser of the method. The same general methods used to prevent illegitimate copying of text files by users will be utilized to prevent the illegitimate copying of such non-text-file materials.

The method of the invention can be applied by a publisher to any digital document, including documents the contents of which have been modified, and documents that have not been modified by a user.

The method can be applied to all digital documents such as in addition to text, sound, image, photograph movie, or Flash documents, and multimedia documents. The method is suited to the publication of multi-page digital documents with interleaves, multipage digital documents without interleaves, and single-page digital documents.

The method allows dissemination of digital documents as one or more executable email attachments, in ways that sharply diminish the likelihood that plural copies of this executable can be made. Through this method the number of downloadings of the executable attachments is limited to no more than one.

Digital documents under this method, if such is the intent of the publisher, can be made not modifiable. As a non-limiting example, this can be achieved through a modification the program file of the document in ways such that the display of the document's text file by the proprietary web browser is prevented.

If such is the publisher's intent, digital documents—particularly but not solely textual documents and multimedia documents embodying text, thus also sound documents and documents of other types—can be distributed in one modifiable version and also in another unmodifiable version, these versions being otherwise identical.

Each copy of a particular digital document that will be issued can embrace a unique and specific-to-it alphanumeric identifier, such as in a non-limiting implementation the filename of the executable that will be disseminated. Thereby, according to the method, the publisher can block the creation of a plurality of copies of each executable file.

When the executable attachment is to be stored on a storage device according to the method of the invention, simultaneously the alphanumeric value assigned to the executable file will be stored in a certain defined string variable on the storage device. Once such a value has been assigned to this string variable, it will be permanent; that is, it can never be erased, modified, over-written, or deleted from the string variable.

Then, before any executable attachment can be downloaded onto the correct-for-it storage device, the storage device must query this string variable to determine if the executable file's alphanumeric value is among the values currently assigned to this variable. If the respective alphanumeric value is among those values, transfer of the executable file to the storage device will be blocked.

Thus according to the method, from an email where an executable file has been present as an attachment the executable file can be downloaded at most once onto a storage device.

The method for assignment of the correct alphanumeric value to an executable attachment by the publisher's server is as follows. Before a user requests a digital document from the publisher's website, the user indicates which storage device will be utilized to store this executable file by entering a known-to-the-user "unit number" of the storage device. Thereby the publishers server will be informed of the unique encrypted global identifier of the target storage device.

By a publisher's server-side encryption program, the unique encrypted global identifier, in conjunction with a unique item number assigned to the digital document by the publisher at the time of its publication, and in conjunction with the number "1", or "2" or "3", and so forth, according to whether this is the first, or second, or third, and so forth, instance of purchasing of the executable file by the user—together with the first, or second, or third, and so forth, instance of assigning of the executable file to the same storage device—will be utilized to assign the correct unique alphanumeric value to the executable file.

The only instance in which an executable file can be returned to its first storage device occurs when the executable is simultaneously erased from a subsequent storage device, according to the executable transfer method described herein. In this case, the presence of the executable file's alphanumeric value in the defined string variable will not be countermanding, according to instructions occurring in the operating instructions of both storage devices, but more relevantly the first.

A user who wishes to obtain a second, or third, and so forth, copy of a digital document from its publisher can do so simply if he will assign the respective further executable, or executables, to a further storage device, or devices. However, if this in not desired, and the user wishes to assign the second executable or second and further executables to the first storage device, this can be done by the user at the publisher's website, at the time when the procuring of the further digital document or documents occurs, by emplacing in lieu of the number "1" during the process through which the executable attachment's unique correct alphanumeric value will be set, the number "2", or "3", and so forth, as appropriate—use of the values "1", "2", and "3", here and in the previous example being a non-limiting example.

The proprietary browser, through features in its software code, can block creation of screen shots of pages of digital documents by users.

In the case of digital documents the viewing of whose text file in the user interface application by users is permitted, particularly in the case where the document is provided to users by the publisher at a non-zero financial cost, not the entire text file will be revealed to the user unless and until the entire document has been consumed by the user, or until the total document price has been paid non-refundably by the user.

When neither of these conditions holds, the only portions of the text file that can be viewed by the user are those that at that time of the user's request correspond to the screens and interleaves that have already been consumed by the user.

In order to register any permanent memory device at the publisher's web page, the user will insert, for example, an ordinary USB drive into an accessory drive port on his computer. He will go to the publisher's website and indicate that he wants to register this drive. The publisher's server will search for the memory USB drive in the computer, and then, on finding it, record its Container ID. The publisher's server will match the Container ID with a secondary key sequence and a rule for its use. Both of these will be communicated to the user. The server will transmit a uniquely numbered B" web browser to the user's now-registered USB drive, while matching the browser's unique alphanumeric code with the other two, already-recorded bits of data. The publisher's server can direct the user to a list of items that the publisher has "on offer," from which, by clicking on an item, the user can be directed to the respective key-sequence page.

Post-purchase two-factor authentication: Once a user has registered a USB drive and stored digital assets on it, he may apply a password to the B" browser and may apply standard two-factor authentication to it.

Preventing theft of items at the RAM nexus: The B" browser will have its own unique JavaScript engine.

"Breaking up" a digital item by a publisher will be optional.

A variation of the method of the invention does not require registration of any digital storage device for distribution of digital assets by a publisher. According to this variation, as a first step, at the publisher's website the user would obtain a secondary key sequence and its "rule", and a uniquely ID-numbered B" browser. In this same user visit, the publisher's website would obtain the user's IP address and assign to the user a unique URL at which will be presented to the user the "universal" key-sequence webpage for the digital asset at issue. Then the publisher's server will link this user to that URL. The multiple, unique URL assignments will be made by a server-side program that has been created by the publisher, yet housed at the publisher's ISP. At the URL that presents the key-sequence web page to the user, the user will key in a key sequence that is a combination of action keys and non-action keys, as he has been requested to do. This aspect of the method is unchanged, as are the facts that once the user has clicked on the hyperlink that he believes is correct, first, the current value of the cVar variable's will be communicated to the publisher's server, and, second, the requested hyperlink if it is correct will be effected. However, rather than the publisher's server determining whether the user has a suitable registered jump drive available in an accessory drive port, the following single step will occur: the publisher's server will determine if the value of cVar that has been submitted to it from the user's computer is "expected" for this particular key-sequence URL.

If the answer is "yes," and there has been a "match" between the user's value of cVar and the expected value of it for this URL, the publisher's server will assign to a bVar variable on the server-side, for this IP address, a temporary binary value whose value means "yes, this user is approved to obtain the digital asset." And immediately the publisher's server will hyperlink the user to the asset distribution webpage for the digital asset at issue. Then at this asset distribution webpage, the user can pay for that asset if such is required and click on a link to cause the respective executable or executables to be transmitted to his computer. There, according to elements of the B" browser program, the executable file or files representing the digital asset, upon transmittal to the user, will be stored in the identical folder in the same memory location where the "matching" B" browser has been stored.

If later, the user wishes to obtain a different asset or different assets from this publisher, the first step will apply. However in place of the next step, the user's server will search for a uniquely numbered B" browser in any storage location in or attached to the user's computer. Therefore, through this method, instead of a USB drive's being registered to a user, a B" browser will be.

It is worth noting that under this variation of the method, digital assets may be freely moved. However, such cannot be utilized unless their matched B" browser is likewise moved. At the publisher's option, to keep assets from being moved, the publisher can at some point in the process register a digital storage device to the user.

Through an alternate, simpler, implementation of the method, a publisher can issue digital documents that will, despite the method's simplification, be irreproducible by users. Simultaneously, however, one particular feature of the general method will be lost, that is, the capacity of users to modify digital documents after their acquisition by these users.

In this implementation, several features of the general implementation will be eliminated; "registered" thumb drives, most of the general and alternate methods' cryptographic features, distribution of a separate "program file" and "text file" for every digital document, and dissemination of digital documents by email. Two features of the general implementation of the method will be maintained: the key sequence web page, and the cVar string variable deriving from the user's utilization of this web page. A proprietary browser coded for in a different way than the B' browser of the general method will be employed in this implementation of the method, that browser being referred to as the B''' browser.

To acquire a digital document under this implementation, a user will visit the publisher's web page to obtain an intravening sequence which is to be employed by this user at a key sequence web page—no differently than in the general implementation of the method. However, in this alternate implementation, rather than obtaining a registered drive from the publisher also at this step, the user will receive a uniquely numbered B''' browser (where that number will be an alphanumeric value), to be sent to the user's computer via FTP or similar protocol for installation on the computer's hard drive. This B''' browser will be matched to the intravening sequence that is disseminated to this user at the same time; thus, rather than, as in the general method, its being the registered jump drive's unique alphanumeric value, in conjunction with the value of the cVar string variable, that is determinative of whether a digital document will be issued by the publisher, in this alternate implementation, it will be the unique alphanumeric value that is assigned to the B''' browse in conjunction with the cVar variable that will be so. If authorization is granted by the publisher's server, the desired digital document will be disseminated by the server, such as by FTP, to the user's computer for storage on that computer's hard drive.

Where a digital document executable has been stored on a hard drive under this implementation, it will be converted back into its original form (for example, JavaScript) by a functionality that is assigned to the B''' browser, itself. Whether another digital document executable that is in storage on the hard drive can be opened by the B''' browser will be determined by another functionality of the B''' browser, an algorithm that will analyze whether unique alphanumeric value that should be present in this executable's file name is correct. If such an alphanumeric value is absent from the executable's file name, it will not be opened. Furthermore, if such an alphanumeric value is present in the executable's file name but has been found to be incorrect by this algorithm, it will, again, not be opened.

The B''' browser will be handicapped so as to be unable to display the source code of digital documents that are presented by this browser. It will be unable to generate screen shots of any web page, and it will be unable to print. The B''' browser will not have an address bar, and it will not display the storage location of the digital documents that are presented to users with it. Executable digital documents that are in storage on a hard drive will not be listed in the hard drive's file directory, per coded instructions in these documents.

An exemplary method for publishing an "un-copyable" book by the pre-loading of two executables onto a digital storage device will now be described. Executable 1: For the digital book itself, the original JavaScript file representing the book would be converted into an executable file, which would be loaded onto a thumb drive. This executable file would only be openable by means of the special proprietary browser, as described below. There would need to be a way of preventing this .exe from being copied onto some other storage medium. Conceivably, that could be by having the browser appear, but not having the book appear, in the file directory. Executable 2: For a browser that's "handicapped" for this method, this browser would not "show source code," and it would not do "screen shots" or print. The only URL it could read would be the one for the book, and that URL would not appear in the address bar. The browser would include an "accessory" program that would convert the book back into JavaScript. After re-conversion, the browser would load the book into RAM. Preferably, the "programming" component of the book would go in en bloc, and then the text would go, one string at a time.

The invention as described provides many advantages. For example, control of dissemination of a digital item by a publisher can be limited so individuals cannot download an item without buying it, and they cannot copy it. In addition, the digital item will exist in a solid physical form—preferably in a portable form—although, if a unit has been lost, its contents can be unusable by an unauthorized person who finds it. The owner of a digital item never will need go back online to use it or, in fact, to permanently modify it. According to the described method, the dissemination of digital items is by a publisher relatively easy to effect—and by users acquisition is, also. Further, only if a publisher wishes to limit the dissemination of a digital title will he need his readers' email addresses Particular exemplary embodiments of the present invention have been described in detail. These exemplary embodiments are illustrative of the inventive concept recited in the appended claims, and are not limiting of the scope or spirit of the invention as contemplated by the inventor.

I claim:

1. A method of obtaining access to a digital asset by a user at a user computer, comprising:
   obtaining a registered storage device, a secondary key sequence, and a key-sequence rule, from a distribution outlet, wherein the registered storage device includes a unique device identifier and a dedicated asset browser;
   connecting the registered storage device to a port of the user computer;
   accessing, by the user, a key-sequence web page associated with the digital asset and an primary key sequence;
   entering, by the user at the key-sequence web page according to the key-sequence rule, a user key sequence including elements of the secondary key sequence and elements of the primary key sequence, thereby revealing a key-sequence hyperlink;
   generating a string variable corresponding to the entered user key sequence;
   selecting the key-sequence hyperlink;
   transmitting the string variable, the device identifier, an IP address of the user computer, and a URL of the key-sequence web page to the distribution outlet in response to selection of the key-sequence hyperlink;
   validating the string variable and the device identifier at the distribution outlet;
   displaying an asset acquisition web page at the user computer, only if the string variable and the device identifier validated positively, wherein the asset acquisition web page includes an asset hyperlink;
   selecting, by the user, the asset hyperlink;

transferring the digital asset to the user computer in response to selection of the asset hyperlink, wherein the digital asset includes a program file and a content file;

storing the digital asset to the user computer, only if the device identifier corresponds to a file code included in at least one of the program file and the content file;

selecting the stored digital asset;

merging the program file and the content file in response to selection of the stored digital asset; and presenting the digital asset to the user via the dedicated asset browser.

2. The method of claim 1, wherein obtaining a registered storage device includes providing to the user, by the distribution outlet, a storage device, and associating, by the distribution outlet, the unique device identifier of the storage device with the user and with the secondary key sequence.

3. The method of claim 1, wherein obtaining a registered storage device includes:

connecting a storage device at a port of the user computer; connecting the user computer for communication with a distribution outlet server; reading the unique device identifier of the storage device at the distribution outlet server; and associating, by the distribution outlet, the unique device identifier of the storage device with the user and with the secondary key sequence.

4. The method of claim 1, further comprising storing the string variable in RAM at the user computer.

5. The method of claim 1, wherein: entering, by the user at the key-sequence web page according to the key-sequence rule, a user key sequence including elements of the secondary key sequence and elements of the primary key sequence, thereby revealing a key-sequence hyperlink includes revealing a series of key-sequence hyperlinks as the user key sequence is entered: and selecting the key-sequence hyperlink is selecting a correct one of the series of key-sequence hyperlinks.

6. The method of claim 1, further comprising requiring payment from the user before downloading the digital asset to the user computer in response to selection of the asset hyperlink.

7. The method of claim 1, further comprising requiring download authentication prior to downloading the digital asset to the user computer in response to selection of the asset hyperlink.

8. The method of claim 1, wherein the program file and the content file are first and second JavaScript programs.

9. The method of claim 8, wherein the dedicated asset browser includes a unique JavaScript engine configured to prevent copying of the contents of RAM of the user computer.

* * * * *